United States Patent Office 2,921,094
Patented Jan. 12, 1960

2,921,094

ω-(N-METHYL-2,6-DIALKYLANILINO)ALKYL HALIDES

Seymour L. Shapiro, Hastings on Hudson, and Louis Freedman, Bronxville, N.Y., assignors to U.S. Vitamin & Pharmaceutical Corporation, a corporation of Delaware No Drawing. Application January 17, 1958
Serial No. 709,446

6 Claims. (Cl. 260—577)

This invention is concerned with ω-(N-methyl-2,6-dialkylanilino)alkyl halides having the following formula:

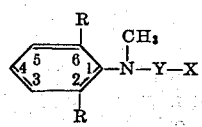

wherein R is methyl or a straight chain lower alkyl group and Y is a bivalent straight chain hydrocarbon linking element which may be saturated or unsaturated and which contains at least three carbon atoms and not more than twelve carbon atoms and especially three to six carbon atoms, and X is halogen.

The compounds of this invention are of utility per se in view of their pharmacological properties, particularly as ganglionic blocking agents, hypotensive agents, and central nervous system depressants.

The compounds of this invention also have distinct chemical properties in that in view of steric factors associated with the presence of the methyl group, and the Y—X linkage on the nitrogen, and the presence of alkyl groups in the 2 and 6 positions of the benzene rings, the compounds in contrast to the usual dialkylaminoalkyl halide resist self-quaternization. The compounds of this invention can, however, form useful pharmaceutical agents by appropriate reactions which yield mixed functional tertiary amine-quaternary amine structures by reaction with tertiary amines, as shown in the equation

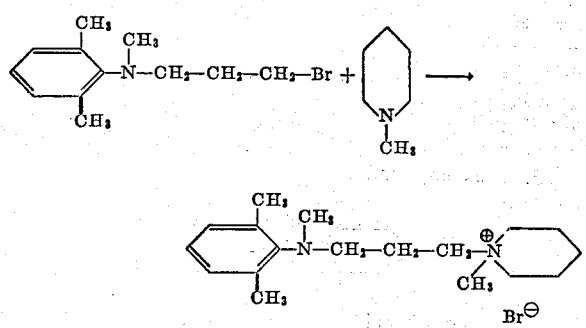

These quaternized derivatives of the ω-(N-methyl-2,6-dialkylanilino)alkyl halides with tertiary amines are also to be considered within the purview of this invention.

The quaternization is desirably carried out in an inert organic solvent such as acetonitrile, nitromethanol, isopropyl alcohol and the like, and at reaction temperatures ranging from 20° C. to 100° C.

The anilinoalkyl halide compounds of this invention are prepared by reaction of the N-methyl-2,6-dialkylaniline with an excess of a dihalide of the type X—Y—X, wherein Y and X have the same significance as described above. Desirably, potassium iodide is added to expedite the reaction.

As more specifically illustrative of the preparation of the compounds contemplated by this invention, the following specific examples of the preparation of specific compounds contemplated by this invention will serve to exemplify the preparation of all the several compounds, since all of the several compounds contemplated will be prepared in the same manner with the selection of starting materials required for the production of any particular desired specific compound.

EXAMPLE I

N-methyl-2,6-dimethylaniline

A mixture of 140 g. (1.14 moles) of 2,6-dimethylaniline and 140 g. (0.98 mole) of methyliodide was heated on the steam bath for 0.25 hour. The crystalline mass which formed, 217 g., was separated, rinsed with ether, dried and treated with 300 ml. of water. After addition of excess 6 N sodium hydroxide, the product was extracted with three 200 ml. portions of ether. The combined ether extracts were dried (magnesium sulfate), filtered, the ether removed and the residue distilled. The product, 96.7 g. (69%), was collected and boiled at 206° C.

EXAMPLE II

N-methyl-2,6-diethylaniline

In a manner similar to that described above using 2,6-diethylaniline, the product was obtained in 81% yield, boiling at 229–231° C.

Analysis.—Calcd. for $C_{11}H_{17}N$: C, 80.9; H, 10.5; N, 8.6.
Found: C, 80.8; H, 10.7; N, 8.6.

EXAMPLE III

N-(6-bromohexyl)-N-methyl-2,6-dimethylaniline

A mixture of 9.25 g. (0.0685 mole) of N-methyl-2,6-dimethylaniline, 33.4 g. (0.137 mole) of 1,6-dibromohexane and 50 mg. of potassium iodide was heated in an oil bath at 140° C. for 25 minutes. After addition of 100 ml. of water, the cooled mixture was made alkaline with 6 N sodium hydroxide and promptly extracted with three 100 ml. portions of ether. The combined ether extracts were dried (magnesium sulfate), filtered, the ether removed and the residue distilled. The product, 7.1 g. (35%), was obtained, boiling at 146–154° C./0.5 mm.

Analysis.—Calcd. for $C_{15}H_{24}BrN$: N, 4.7. Found: N, 4.6.

EXAMPLE IV

N-methyl-[3-(N-methyl-2,6-dimethylanilino)propyl]-piperidinium bromide

A mixture of 1.79 g. (0.007 mole) of N-(3-bromopropyl)-N-methyl-2,6-dimethylaniline and 0.73 g. (0.0074 mole) of N-methylpiperidine in 5 ml. of acetonitrile was heated under reflux for one hour. On cooling, 0.95 g. (38%) of colorless crystals were filtered off, washed with ethylacetate and dried in vacuo, M.P. 185–187.5° C.

*Analysis*—Calcd. for $C_{18}H_{31}BrN_2$: C, 60.8; H, 8.7; N, 7.9; Br, 22.5. Found: C, 60.9; H, 8.8; N, 7.9; Br, 22.6.

Typifying, but not limiting the products herein, there is reported in Table I, a series of compounds with their physical properties, which have been prepared following the procedure described in Example III.

TABLE I

ω-(N-methyl-2,6-dialkylanilino)alkyl halides

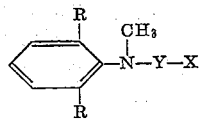

| R | Y | X | B.P., ° C. | mm. Press. | Formula |
|---|---|---|---|---|---|
| $CH_3-$ | $-(CH_2)_3-$ | Br | 90–94 | 0.2 | $C_{12}H_{18}BrN$ |
| $CH_3-$ | $-(CH_2)_4-$ | Cl | 94–98 | 0.07 | $C_{13}H_{20}ClN$ |
| $CH_3-$ | $-(CH_2)_4-$ | Br | 98–102 | 0.18 | $C_{13}H_{20}BrN$ |
| $CH_3-$ | $-(CH_2)_5-$ | Br | 124–128 | 0.4 | $C_{14}H_{22}BrN$ |
| $CH_3-$ | $-(CH_2)_6-$ | Br | 146–154 | 0.5 | $C_{15}H_{24}BrN$ |
| $CH_3-$ | $-CH_2CH=CHCH_2-$ | Cl | 92–96 | 0.08 | $C_{13}H_{18}ClN$ |
| $C_2H_5-$ | $-(CH_2)_3-$ | Br | 108–112 | 0.1 | $C_{14}H_{22}BrN$ |
| $C_2H_5-$ | $-CH_2CH=CHCH_2-$ | Cl | 104–106 | 0.26 | $C_{15}H_{22}ClN$ |

The compounds of the type shown in Table I can in turn be reacted with lower alkyl tertiary amines which may be exemplified by tri-methylamine, tri-ethylamine, N-methylpiperidine, N-methylpyrrolidine, N-methylmorpholine and the like as has been shown in the foregoing equation.

Examples of such preparations are typified by compounds prepared and described in Table II following the procedure of Example IV. The group $N_1$—Am represents the lower alkyl tertiary amine used to form the quaternary salt.

Examples of such preparations are typified by compounds prepared and described in Table II following the procedure of Example IV. The group $N_1$—Am represents the lower alkyl tertiary amine used to form the quaternary salt.

TABLE II

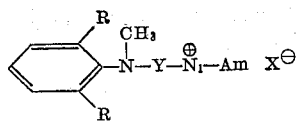

| R | Y | $N_1Am$ | X | M.P., ° C. | Formula |
|---|---|---|---|---|---|
| $CH_3-$ | $-(CH_2)_3-$ | triethylamine | Br | 142–144 | $C_{18}H_{33}BrN_2$ |
| $CH_3-$ | $-(CH_2)_3-$ | N-methylpiperidine | Br | 185–187 | $C_{18}H_{31}BrN_2$ |
| $CH_3-$ | $-(CH_2)_4-$ | triethylamine | Br | 150–152 | $C_{19}H_{35}BrN_2$ |
| $CH_3-$ | $-(CH_2)_6-$ | N-methylpiperidine | Br | 133–134 | $C_{21}H_{37}BrN_2$ |

In a manner similar to that of the foregoing description cited in the examples and tables, other ω-(N-methyl-2,6-dialkylanilino)alkyl halides may be processed such as ω-(N-methyl-2,6-diethylanilino)-octamethylenebromide, ω-(N-methyl-2,6-dimethylanilino)-decamethylenebromide, etc. These in turn can be converted to mixed tertiary amine-quaternary ammonium salts by reaction with tertiary amines.

Various modifications may be made in the method and compounds of the present invention without departing from the spirit and scope thereof, and it is to be understood that we limit ourselves only as defined in the appended claims.

Having described our invention, what we claim as new and desire to secure by Letters Patent is:

1. The compound having the formula

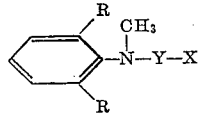

wherein R is selected from the group consisting of methyl and ethyl, Y is a member of the group consisting of a straight chain bivalent saturated hydrocarbon linking element containing from three to six carbon atoms and $-CH_2-CH=CH-CH_2-$ and X is a member of the group consisting of chlorine and bromine.

2. The compound

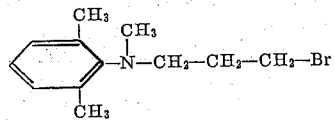

3. The compound

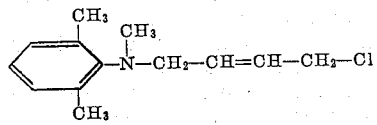

4. The compound

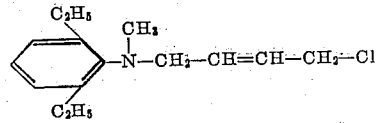

5. The compound

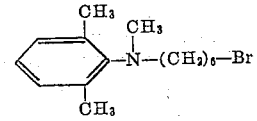

6. The compound

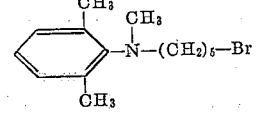

(References on following page)

References Cited in the file of this patent

UNITED STATES PATENTS

| | | |
|---|---|---|
| 1,777,970 | Hartmann | Oct. 7, 1930 |
| 2,234,501 | Nusslein et al. | Mar. 11, 1941 |
| 2,694,715 | Stayner | Nov. 16, 1954 |
| 2,700,027 | Bruson | Jan. 18, 1955 |

FOREIGN PATENTS

| | | |
|---|---|---|
| 200,910 | Switzerland | Jan. 16, 1939 |
| 604,675 | Great Britain | July 8, 1948 |

OTHER REFERENCES

Braun et al.: Deut. Chem. Gesell. (Berichte), vol. 70–B, page 985 (1937).

Munch et al.: J. of the Am. Chem. Soc., vol. 68, 1297–8 (1946).

Boon: Chem. Absts., vol. 41, 5447g (1947).

Everett et al.: J. of the Chem. Soc. (1949), page 1977.

Babayan et al.: Chem. Absts., vol. 49, page 11,576c (1955).